July 3, 1951 P. E. KAMP 2,559,252
TOOTH FOR SULKY RAKES
Filed Dec. 20, 1949
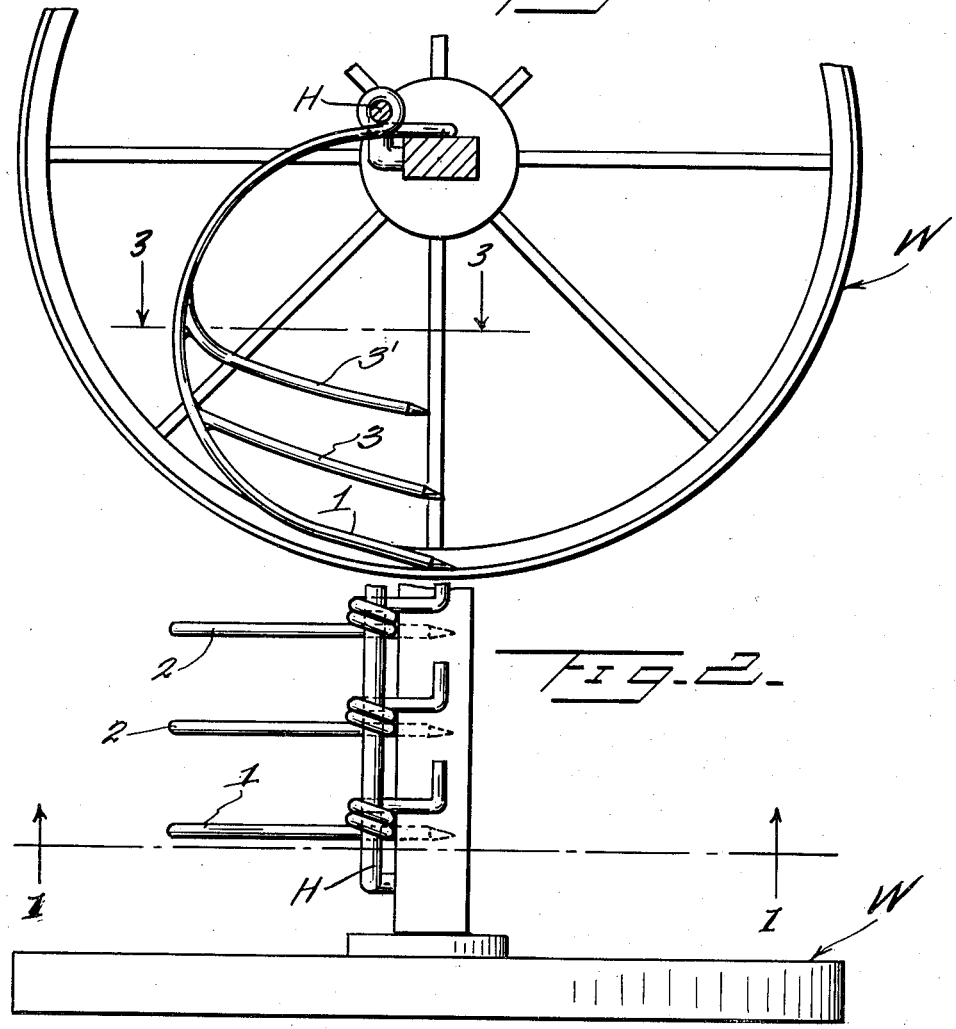
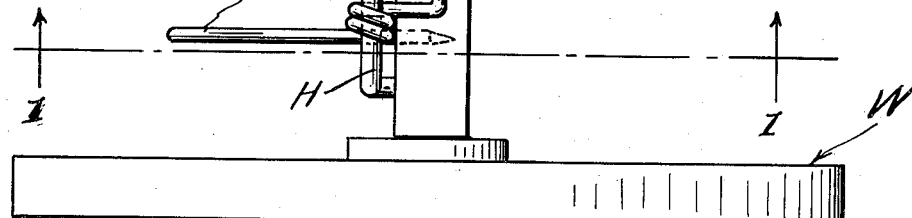
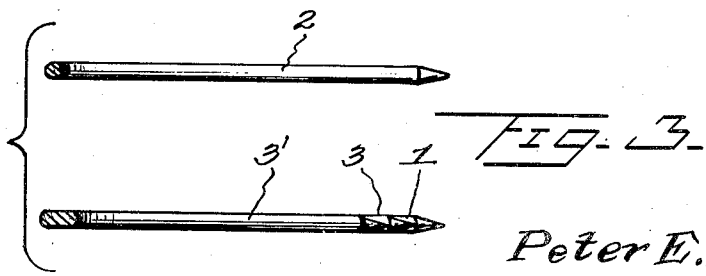
INVENTOR
*Peter E. Kamp*
BY *Wilfred E. Lawson*
ATTORNEY Patented July 3, 1951

2,559,252

UNITED STATES PATENT OFFICE 2,559,252

TOOTH FOR SULKY RAKES

Peter E. Kamp, Walcott, Wyo.

Application December 20, 1949, Serial No. 134,047

1 Claim. (Cl. 56—400)

This invention relates to a tooth for a sulky rake and it is an object of the invention to provide a tooth of this kind to be so positioned to prevent hay or the like from running out into a wheel of the sulky and also to prevent the hay or the like from rolling at an end of the rake.

The invention consists in the details of construction and in the combination and arrangement of the several parts of my improved tooth for a sulky rake whereby certain advantages are attained, as will be hereinafter more fully set forth.

In order that my invention may be better understood, I will now proceed to describe the same with reference to the accompanying drawings, wherein:

Figure 1 is a view partly in section and partly in elevation illustrating a tooth constructed in accordance with an embodiment of the invention, the section being taken substantially on the line 1—1 of Figure 2;

Figure 2 is a fragmentary view in top plan of one side portion of the sulky rake; and Figure 3 is a fragmentary detail sectional view taken substantially on the line 3—3 of Figure 1.

As illustrated in the accompanying drawings, H denotes the usual head or bracket of a sulky rake for the teeth 1 and 2, which are of identical form, except that the tooth structure, at each end of the rake, is provided, in addition to the tooth or tine 1, with teeth or tines 3 and 3' that are disposed in spaced relation above and in line with the tooth or tine 1, substantially as shown in Figures 1 and 3.

Each end tooth or tine 1 at its lower portion has rigid therewith the forwardly directed tines 3 and 3' herein shown as substantially equidistantly spaced, with the tine 3 spaced from the bottom portion of the tooth or tine 1 substantially the same as the spacing between adjacent tines 3 and 3'.

As herein embodied the tines 3 and 3' are coplanar with each other and with the lower portion of the tooth or tine 1. The tine 3 terminates slightly inward of the lower free end of tooth or tine 1, the tines 3 and 3' successively from below terminates slightly inward of each other.

While the drawings only show two tines, it is believed apparent this number may be increased as desired without departing from the invention as herein comprised.

It is believed obvious that by providing each end tooth 1 of a sulky rake with the tines 3 and 3', effective means is provided to prevent the hay or the like rolling out on the adjacent wheel or from rolling up at each end of the rake.

From the foregoing description it is thought to be obvious that a tooth for a sulky rake constructed in accordance with my invention is particularly well adapted for use by reason of the convenience and facility with which it may be assembled and operated.

I claim:

As a new article of manufacture, an end tooth structure for a sulky rake or the like, comprised in a main tine of curved form and other tines spaced apart above and in substantially the same plane with said main tine, said other tines having their rearwardly directed ends welded to said main tine and their forwardly directed ends unsupported and staggered slightly rearward with respect to the like end of the main tine.

PETER E. KAMP.

REFERENCES CITED

The following references are of record in the file of this patent:

UNITED STATES PATENTS

| Number | Name | Date |
|---|---|---|
| 566,868 | Reed | Sept. 1, 1896 |
| 586,447 | Mellinger | July 13, 1897 |
| 1,179,676 | Storm, Jr | Apr. 18, 1916 |
| 1,194,988 | Flakus | Aug. 15, 1916 |